Figure 11:
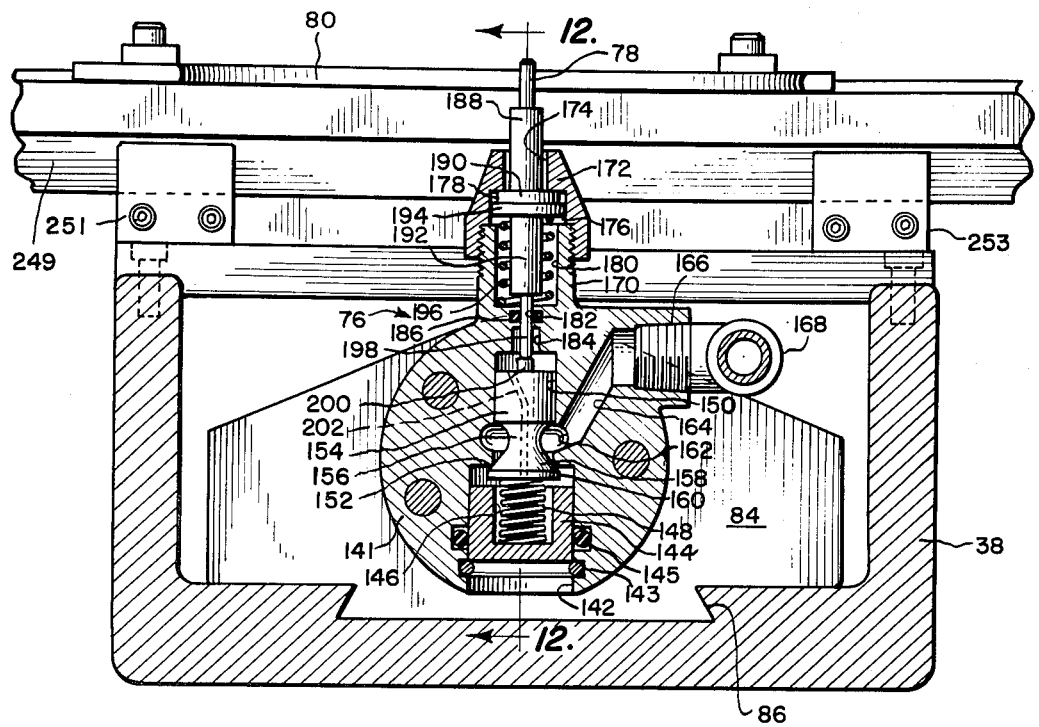

March 1, 1966
F. F. BADALLI
3,237,491
TEMPLATE CONTROLLED MACHINE TOOL
Filed July 18, 1963
4 Sheets-Sheet 1
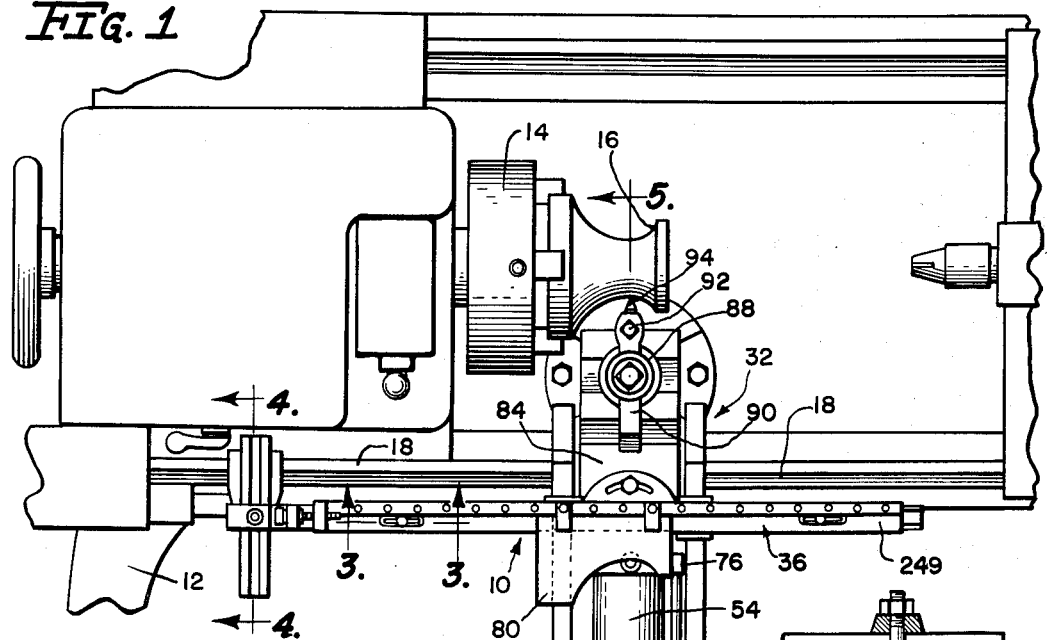
INVENTOR.
Fred F. Badalli
BY John F. Brezina
Atty.

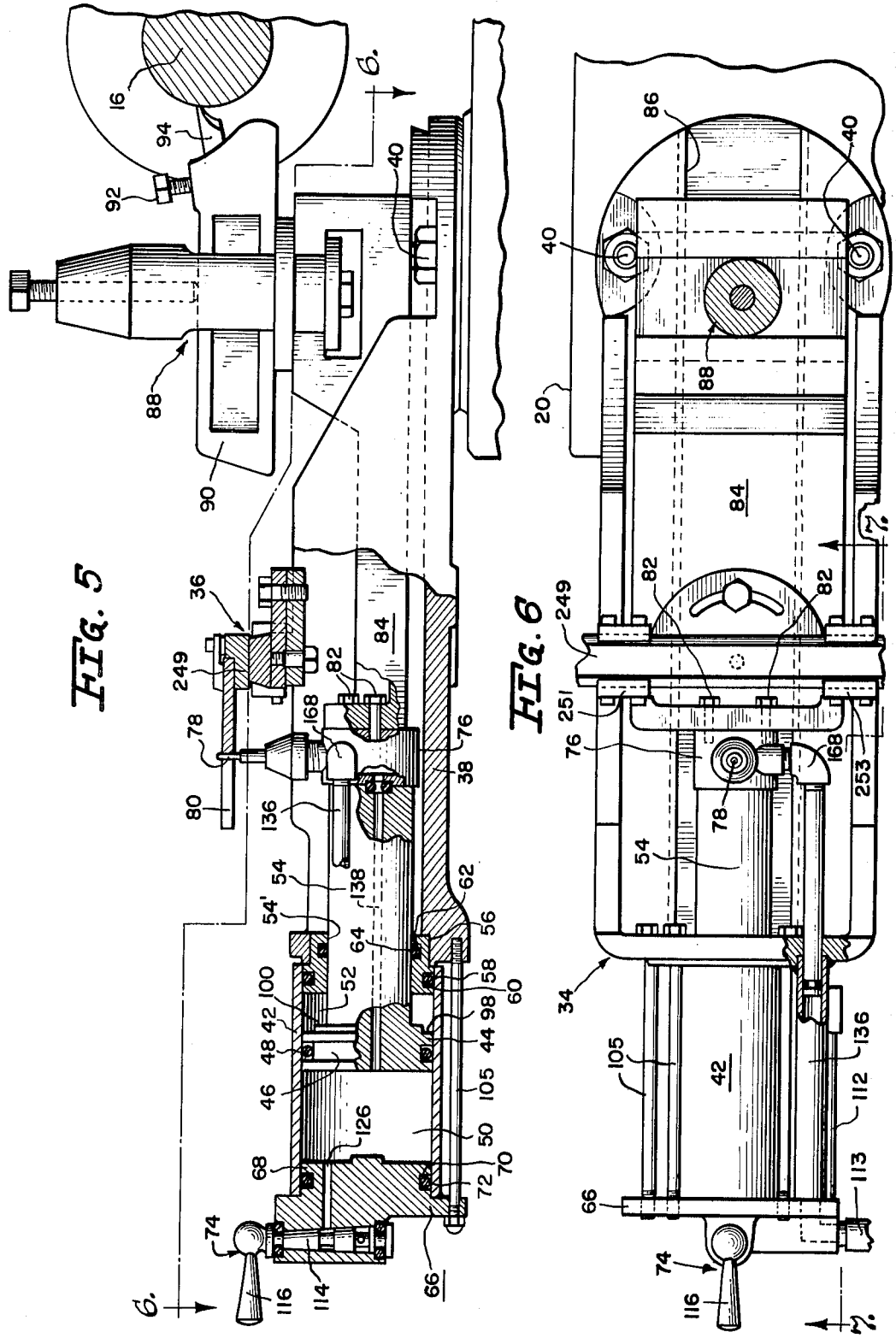

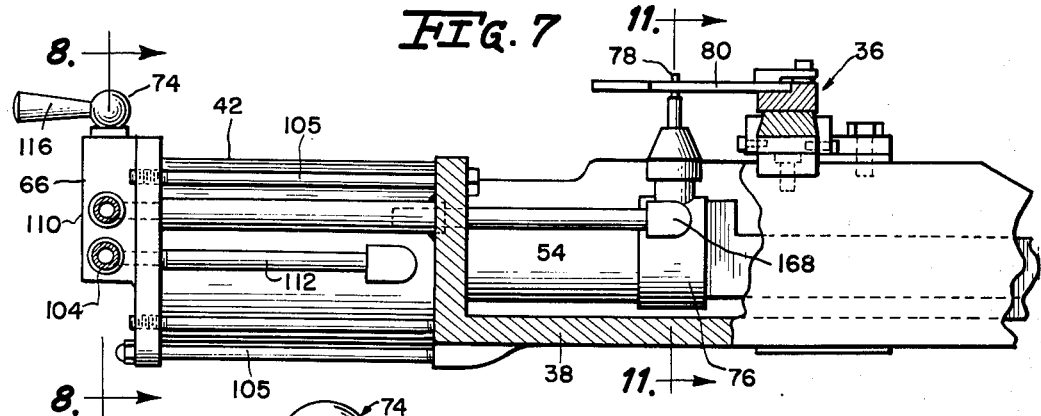

March 1, 1966 F. F. BADALLI 3,237,491
TEMPLATE CONTROLLED MACHINE TOOL
Filed July 18, 1963 4 Sheets-Sheet 4

INVENTOR.
Fred F. Badalli
BY John F. Brezina
Atty.

United States Patent Office 3,237,491
Patented Mar. 1, 1966

3,237,491
TEMPLATE CONTROLLED MACHINE TOOL
Fred F. Badalli, Munster, Ind., assignor to Lathe Attachments Manufacturing Co., Chicago, Ill., a corporation of Illinois
Filed July 18, 1963, Ser. No. 296,007
2 Claims. (Cl. 82—14)

This invention relates to machine tools and, more particularly, to a lathe having a tracer attachment by means of which a workpiece may be shaped to the exact contour of a pre-selected template. More particularly, the invention is directed to a tracing attachment in which the contours of the template are followed with extreme accuracy by a stylus which controls the operation of a hydraulic cylinder in such a way that a decrease in effective pressure effects retraction of a cutting tool.

Heretofore, tracing apparatus for machine tools had been devised which included a longitudinally movable carriage having a track extending transversely of the machine tool for reception of a cross slide on which was mounted a tool post for adjustably mounting a cutting tool, and a stylus for controlling the operation of a hydraulic cylinder for moving the cutting tool into engagement with the workpiece in response to the contour of a template followed by the stylus. In the prior art apparatus the stylus controlled the operation of a tracer control valve which supplied fluid under pressure to one side or the other of a piston slidably received in a cylinder for movement of the cutting tool into or out of engagement with the workpiece. A disadvantage of this arrangement has been that the tracer control valves utilized were not sensitive to the changing configuration of the template. In particular, the prior art tracer control valves were characterized by sufficient mechanical lost motion to prove unsatisfactory in duplicating a template contour. Another disadvantage of the prior art template controlled machine tools was that the selective application of positive pressure to move the cutting tool resulted in surging and contributed further to the inaccurate results.

A principal object of the invention is to provide a template controlled machine tool which is characterized by precise duplication of the contour of a template, and which is characterized by relative simplicity as compared with prior art devices.

A further object of the invention is to provide a template controlled machine tool of the stated type wherein hydraulic fluid of a pre-determined pressure is applied to both sides of a piston which is slidably received in a cylinder and in which the cutting tool is constantly urged into engagement with the workpiece by reason of a differential in the surface areas of each side of the piston.

Another object of the invention is to provide a template controlled machine tool in which the cylinder chamber defined in part by the piston surface of greater area is subject to a reduction in fluid pressure upon the slightest change in position of the stylus.

Figure 12:
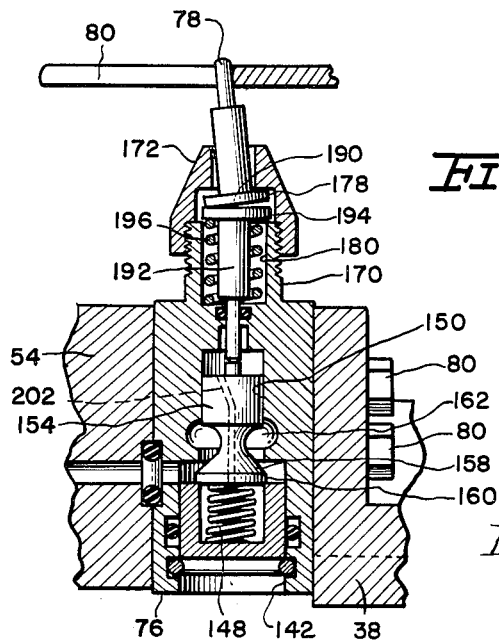

Further objects and advantages of the present invention will become apparent as the following description of an illustrative embodiment of the invention proceeds taken along with the accompanying drawings, in which:

FIGURE 1 is a plan view of a lathe embodying the tracing apparatus of the present invention;
FIGURE 2 is an elevational view of the lathe of FIG. 1;
FIGURE 3 is a fragmentary sectional view taken substantially on line 3—3 of FIG. 1;
FIGURE 4 is an elevational view, partly in section, taken substantially on line 4—4 of FIG. 1;
FIGURE 5 is an elevational sectional view taken on line 5—5 of FIG. 1;
FIGURE 6 is a plan view taken substantially on line 6—6 of FIG. 5;
FIGURE 7 is an elevational view, partly in section, taken substantially on line 7—7 of FIG. 6;
FIGURE 8 is a greatly enlarged elevational sectional view taken substantially on line 8—8 of FIG. 7;
FIGURE 9 is a sectional plan view taken substantially on line 9—9 of FIG. 8 and showing a manual control valve forming a part of the present invention in the position it assumes when the tracing apparatus of the present invention is in tracing position;
FIGURE 9a is a view similar to FIG. 9 but showing the manual control valve in the position it assumes when rapid manual reversal of the cutting tool is desired;
FIGURE 9b is a sectional view of the control valve of FIG. 9 when no movement of the cutting tool is desired;
FIGURE 9c is a view similar to FIG. 9, but showing the control valve in the position it assumes when rapid manual advance is desired, such as to bring the cutting tool into operative position;
FIGURE 10 is a view in perspective of the tracing apparatus of the present invention with the cross slide and tool post removed for the sake of clarity;
FIGURE 11 is a greatly enlarged elevational sectional view showing details of the tracer control valve; and
FIGURE 12 is an elevational sectional view taken substantially on line 12—12 of FIG. 11.

Referring now to the drawings, and more particularly to FIGS. 1 and 2, the template controlled machine tool of the present invention is indicated generally by reference numeral 10 and includes a frame or base 12 on which is mounted the conventional motor and gearing for rotating a chuck 14 which secures for rotation a workpiece 16. A longitudinally extending way 18 is mounted on the base 12 for the sliding movement of a carriage 20 in response to rotation of a feed screw 22. Adjustment of the position of the carriage 20 with respect to the feed screw 22 may be effected by a conventional handwheel 24. The top surface of the carriage 20 is formed with mortised slots 26 and 28 for sliding reception of a cross-slide 30.

The tracer apparatus of the present invention is indicated generally by reference numeral 32 and includes a tracing assembly 34 and a template mounting assembly 36. The assembly 32 is shown mounted on the conventional slide 30. It is contemplated only that the assembly 32 be fixed to the carriage 20. The tracer assembly 34 includes a frame 38 affixed to the cross slide 30 by means of bolts 40 (see FIGS. 5 and 6). Secured to one end of the frame 38 is a hydraulic cylinder 42 within which is slidably mounted a piston 44 having a peripheral slot 46 for reception of a sealing O-ring 48. The piston 44 divides the interior of the cylinder 42 into chambers 50 and 52. A plunger or ram 54 is connected to the piston 44 and extends through an opening 54 in an end cap 56. The end cap 56 has an outer peripheral groove 58 for reception of an O-ring 60 and an inner peripheral groove 62 for reception of an O-ring 64. The O-rings 60 and 64 prevent the flow of hydraulic fluid from the chamber 52, as will be understood. At the other end of the hydraulic cylinder 42 is an end cap 66 having a reduced portion 68, the periphery of which is formed with a groove 70 for reception of a sealing O-ring 72. The end cap 66 is illustrated as being formed with an integrally manual control valve 74, the operation of which will be hereinafter described.

Affixed to the right end of the ram 54, as viewed in FIGS. 5 and 6, is a tracer control valve 76 having a stylus 78 which follows the contour of a template 80 in a manner hereinafter described. Secured to the tracer control valve 76, by means of cap screws 82, is a sub-slide 84 which is slidably received in a way 86 formed in the frame 38 (see FIG. 11). The sub-slide is denoted as such only to distinguish from the slide 30. As pointed out above, the slide 30 may be eliminated and the frame 38 mounted directly on the carriage 20. At the right end of the sub-slide 84, as viewed in FIGS. 5 and 6, is a tool post 88 in which is slidably mounted a tool holder 90 to which is affixed, by set screw 92, a cutting tool 94 which engages the surface of the workpiece 16.

According to the present invention, fluid under the same pressure is introduced into the chamber 50 and 52 and movement of the plunger 54, and, consequently, the sub-slide 84 and the tool 94 is effected by the fact that the surface of the piston 44 defining in part the chamber 50 greatly exceeds the cross-sectional area of the surface of the piston 44 defining the chamber 52. Due to the pressure of the plunger 54, right surface of the piston 44, as viewed in FIGURE 5, comprises only an annular surface 98 and a shoulder 100.

Fluid under pressure may be introduced into the tracer assembly 34 by means of the manually actuated control valve 74, which is illustrated as being integrally formed with the end plate 66. The end plate 66 cooperates with the piston 44 to define the chamber 50, is received within one end of the cylinder 42, and is secured to the frame 38 by means of a plurality of circumferentially spaced tie rods 105. Fluid under pressure may be supplied to the control valve 74 by means of flexible conduit 102 and an inlet 104. This fluid may be stored in a sump 107 and pressurized by means of pump 109 driven by motor 111. Return of the fluid to the sump 107 is effected by means of flexible conduit 113, in a manner hereafter apparent.

Communicating with the inlet 104 is a longitudinal bore 106 (as viewed in FIGURE 8), which extends into fluid communication with a bore 108 formed in valve body 110. Fluid under pressure is supplied to the chamber 52 by means of a conduit 112, communicating with the bore 106. Fluid is delivered to the chamber 50 by operation of the manual control valve 74 which will now be described.

The valve 74 includes a pilot 114 rotatable by a handle 116 to the various positions illustrated in FIGURES 9, 9a, 9b, and 9c, which represent the tracing, backout, neutral and rapid advance position respectively. The pilot 114 is formed with a central bore 118 and has a reduced portion 120 defining, in cooperation with the wall of the bore 108, an annular chamber 120. Fluid communication is afforded between bore 106 and bore 118 by means of a radial bore 122 communicating with the annular recess 120.

In the tracing position illustrated in FIGURE 9, fluid flows through the inlet bore 106 and thence upwardly in the bore 118 by way of the radial bore 122. In the position of the pilot 114, shown in FIGURE 9, the fluid flows through a radial bore 124 of limited diameter into a bore 126 formed in the valve body 110 and communicating with the chamber 50 (see FIGURE 5). By this arrangement, fluid under this same pressure is introduced into both the chamber 50 and the chamber 52 and the plunger 54 is normally urged to the right, as viewed in FIGURE 5, because of the differential nature of the piston 44.

In the event that it is desired to move the tool 94 rapidly to the left, as viewed in FIGURE 5, the pilot 114 is rotated to the position illustrated in FIGURE 9a. In that position the fluid is still supplied to the chamber 52 by means of the conduit 112, but supply of fluid to the chamber 50 by means of the bores 124 and 126 is terminated. Referring to FIGURE 9a, the pilot 114 is formed with an arcuate recess 128 in register with the bore 130 leading to an outlet 132 to which is attached the flexible conduit 113 (see FIGURE 2). Communicating with the bore 130 is a telescopic conduit 136, for a purpose hereafter described. Referring again to FIGURE 5, the plunger 54 is formed with a longitudinally extending bore 138 through which fluid flows from the chamber 50 to the telescopic conduit 136 upon operation of the tracer control valve 76 in a manner hereafter described. It will be understood that fluid is released from the chamber 50 through the bore 138 only when the manual control valve 74 is set at the tracing position illustrated in FIGURE 9.

In FIGURE 9b is shown the neutral position of the manual control valve 74. In that position, fluid flows upwardly through the bore 118 and communicates with the outlet bore 130 by means of a radial bore 140 formed in the pilot 114. It will thus be seen that fluid entering the valve 74 by means of the inlet bore 106 is short circuited to the outlet bore 130 by means of the recess 120, the bore 122, the bore 118, and the bore 140.

When it is desired to advance the tool 94 rapidly towards the workpiece, the pilot 114 is rotated to the position illustrated in FIGURE 9c. In that position the bore 140 is in register with the bore 126 and fluid is directed from the inlet conduit 106 to the chamber 50 by means of the annular recess 120, the bore 122, the bore 118, the bore 140, and the bore 126.

The tracer control valve 76 will now be described in detail with particular reference to FIGURES 11 and 12. The valve 76 is illustrated as having a generally cylindrical body 141 and has a radial bore 142 within which is slidably disposed a hollow plunger 144 having a central cylindrical cavity 146 within which is disposed helical compression spring 148. A retaining ring 143 is mounted below plunger 144, as shown in FIG. 11. A sealing ring 145 prevents the flow of fluid past the plunger 144. Communicating with the bore 142 is a bore 150 of less diameter defining a shoulder 152. Slidably disposed in the bore 150 is a plunger 154 having a recessed portion 156 curving inwardly and connecting with an end portion 158 which flares outwardly beyond the diameter of the plunger 154 forming a valve surface 160, in cooperation with the shoulder 152. The valve surface 160 is normally urged into engagement with the shoulder 152 by means of the spring 148. Extending outwardly from the bore 150 is an annular chamber 162 which is in fluid communication with an angularly extending passage 164 which in turn communicates with an outlet 166 in which is threadedly received an L-fitting 168 to which is connected one end of the telescopic conduit 136. Referring again to FIGURE 5, the bore 138 in the plunger 54 is normally in fluid communication with the space in the bore 142 atop the plunger 144. Fluid communication between the bore 142 and the chamber 162, passage 164, outlet 166, fitting 168 and conduit 136, is afforded by downward movement of the plunger 154 in response to rocking movement of the stylus 78.

Connected to the valve body 141 is an externally threaded boss 170 on which is threadedly received a cap 172 having a central bore 174 communicating with a second central bore 176 of larger diameter and defining a shoulder 178. The boss 170 has a central bore 180 which communicates with the bore 150 by means of a bore 182 and a bore 184. A sealing O-ring 186 is disposed between the bore 180 and the bore 184 for a purpose hereafter apparent.

The stylus 78 is connected to a post 188 which in turn is connected to a flat disc 190. Disposed within the bore 180 is a push rod 192 having secured to its upper surface a disc 194 which is urged into abutment with the disc 190 by means of a helical spring 196. The push rod 192 has a portion 198, of reduced diameter, which engages a boss 200 formed on the top surface of the plunger 154. A longitudinal passage 202 is formed in the plunger 154 normally to provide fluid balance between the bore 150 and the bore 142. The seal 186 prevents escape of fluid from the bore 150 to the bore 180.

In operation, the plunger 154 is moved downwardly against the action of the spring 148 when the stylus 78 is rocked to a position such as that shown in FIGURE 12. When the stylus 78 is in the rocked position, the disc 190 forces the disc 194 downwardly into a position in abutment with the top surface of the boss 170, as shown in FIGURE 12. The push rod 192 is moved downwardly to urge the plunger 154 downwardly so that the valve surface 160 is moved away from the shoulder 152 and fluid flows from the chamber 50 to the sump 107, and the advance of the plunger 54 and the cutting tool 94 is terminated. When the stylus 78 returns to the position illustrated in FIGURE 11, and the manual control valve 74 is in the position illustrated in FIGURE 9, the cutting tool 94 is again urged to the right, as viewed in FIGURE 5, because of the differential nature of the piston 44.

Referring now to FIGURES 1, 2, 3 and 4, the template mounting assembly 36 includes an upstanding standard 237 connected to a clamp 239 having an elongated recess 241 corresponding generally to the configuration of the track or way 18. The clamp 239 includes a plate 243 used in abutment with the bottom of way 18 by bolts 245 and 247 which are threadedly received in the body of the clamp 239. Mounted on the standard 237 is an elongated support bar 249 to which the template 80 is adjustably attached. The right end of the support 249, as viewed in FIGURE 2, rests upon slide blocks 251 and 253 affixed to the top of the frame 38 of the tracer assembly 34. Thus, the support bar 249 and the template 80, is held in the position illustrated in FIGURE 2 by the standard 237 and the two slide blocks 251 and 253. The frame 38 continues to provide support for the bar 249 as it moves along with the carriage 20.

The template controlled machine tool of the present invention exhibits important advantages over template controlled machine tools heretofore known. The present tracer assembly is actuated instantaneously in response to the slightest rocking movement of the stylus. The rocking of the disc 190, which is affixed to the stylus 78, effects immediate downward movement of the disc 194 and, consequently, the valve surface 160 is immediately unseated to afford a decrease in pressure in the chamber 50 by reason of the flow of fluid through the passage 138 in the plunger 54. The responsiveness of the tracer control valve 76 is such that the spring 148 may have a resistance of as little as four ounces. The control of the movement of the cutting tool 94, by a decrease in pressure, solves surging problems common to tracer systems in which retraction of the cutting tool is effected by a positive pressure acting on a piston.

Although particular embodiments of the invention have been shown and described in full herein, there is no intention thereby to limit the scope of the present invention to the details of the described embodiments. It is applicant's intention to be limited only by the scope of the appended claims.

I claim:

1. A tracer control attachment for a lathe having a base, chuck means on said base for supporting and rotating a workpiece about a longitudinal horizontal axis, a way extending longitudinally along one side of said base in parallel relation to said longitudinal horizontal axis, carriage means slidably supported on said way, and feed screw means for moving said carriage, comprising: a frame member having an inner end arranged to be bolted on said carriage to project horizontally outwardly from said one side of said base away from said longitudinal horizontal axis, a slide, a way in an upper surface of said frame member supporting and guiding said slide for movement along a horizontal axis transverse to said longitudinal horizontal axis, tool holder means on an inner end portion of said slide for holding a tool for movement toward and away from said longitudinal axis, a generally cylindrical plunger having an axis parallel to said transverse horizontal axis and having an inner end secured to an outer end portion of said slide, a piston in coaxial relation at the outer end of said plunger and having a diameter greater than that of said plunger, a cylinder affixed to said frame member to receive said piston, an inner end wall on said cylinder having an opening for said plunger and cooperating with said piston to define an annular chamber, an outer end portion on said cylinder cooperating with said piston to define a cylindrical chamber having a cross sectional area substantially greater than that of said annular chamber, a reservoir, pump means for supplying fluid from said reservoir to both of said chambers, means for supporting a template from said one side of said base outwardly from said tool holder means and in a generally horizontal plane above said slide, a stylus carried by said plunger for engagement with said template, valve means including a valve body interposed between said inner end of said plunger and said outer end of said slide, said plunger having a passage therethrough for establishing communication between said cylindrical chamber and said body, conduit means from said valve body to said reservoir, and valve means in said valve body controlled by said stylus for controlling communication between said passage and said reservoir, said valve means including generally vertical post means carrying said stylus at an upper end thereof and having flat disc means at the lower end thereof, said valve body having an opening through which said post means extends and having an internal annular downwardly facing shoulder engaged by the upper surface of said disc means, a vertically movable valve actuator having an upper end engageable with said disc means, and spring means acting on said valve actuator to urge said disc means into engagement with said shoulder, said opening being larger than said post means to permit canting movement of said post means and to move said valve actuator away from said shoulder in response to engagement of said stylus with said template.

2. A tracer control attachment as defined in claim 1 comprising a manually actuatable valve in said outer end wall arranged to control communication between said pump means and said cylindrical chamber.

References Cited by the Examiner

UNITED STATES PATENTS 2,090,178 8/1937 Brickner _____ 90—62
2,645,084 7/1953 Von Zelewsky.
2,676,507 4/1954 LeBrusque et al.

FOREIGN PATENTS 652,537 4/1951 Great Britain.

WILLIAM W. DYER, JR., *Primary Examiner.*